(12) United States Patent
Hubert et al.

(10) Patent No.: US 12,199,491 B2
(45) Date of Patent: Jan. 14, 2025

(54) ELECTRICAL MACHINE HAVING A CONDUCTIVE SLEEVE

(71) Applicant: AKTIEBOLAGET SKF, Gothenburg (SE)

(72) Inventors: Mathieu Hubert, Turin (IT); Paul Feliciano, Saint Cyr-sur-Loire (FR); Thomas Perrotin, Saint Roch (FR); Anthony Simonin, Tours (FR)

(73) Assignee: AKTIEBOLAGET SKF (SE)

( * ) Notice: Subject to any disclaimer, the term of this patent is extended or adjusted under 35 U.S.C. 154(b) by 108 days.

(21) Appl. No.: 17/712,242

(22) Filed: Apr. 4, 2022

(65) Prior Publication Data
US 2022/0329127 A1 Oct. 13, 2022

(30) Foreign Application Priority Data
Apr. 12, 2021 (IT) .................. 102021000009005

(51) Int. Cl.
*H02K 5/173* (2006.01)
*H02K 7/08* (2006.01)
*H02K 11/40* (2016.01)

(52) U.S. Cl.
CPC ........... *H02K 5/1732* (2013.01); *H02K 7/083* (2013.01); *H02K 11/40* (2016.01)

(58) Field of Classification Search
CPC ....... H02K 11/40; H02K 5/1732; H02K 7/083
See application file for complete search history.

(56) References Cited

U.S. PATENT DOCUMENTS

| 8,324,776 B2 | 12/2012 | Tamaoka et al. | |
|---|---|---|---|
| 9,859,672 B2 | 1/2018 | Fukumoto | |
| 2005/0013041 A1 | 1/2005 | MacLeod et al. | |
| 2005/0206270 A1* | 9/2005 | Aisenbrey | H01R 39/20 310/251 |
| 2007/0040459 A1 | 2/2007 | Oh | |

(Continued)

FOREIGN PATENT DOCUMENTS

| DE | 29916854 | 1/2000 |
|---|---|---|
| DE | 102018115732 | 1/2020 |

(Continued)

OTHER PUBLICATIONS

Arakami, machine translation of jp2005114119, Apr. 2005 (Year: 2005).*

(Continued)

*Primary Examiner* — Eric Johnson
(74) *Attorney, Agent, or Firm* — Reed Smith LLP

(57) ABSTRACT

An electrical machine having a non-rotating part, a rotating part, at least one bearing supporting said rotating part and having a rotating ring and a non-rotating ring, a fiber grounding brush fixed to said non-rotating part and having a support secured to the non-rotating part and a plurality of conductive fibers having a first end secured to said support and a second free end, opposite to said first end, extending towards the rotating part, and a conductive sleeve having a base fastened to the rotating part or to the rotating ring of the bearing and a conductive layer covering at a portion of a surface of the base, the second free end of the conductive fibers of the fiber grounding brush being in contact with said conductive layer.

8 Claims, 7 Drawing Sheets

(56) References Cited

U.S. PATENT DOCUMENTS

| | | | |
|---|---|---|---|
| 2008/0258576 A1 | 10/2008 | Oh et al. | |
| 2013/0287329 A1* | 10/2013 | Varnoux | F16C 33/76 384/485 |
| 2014/0334758 A1 | 11/2014 | White | |
| 2016/0372987 A1* | 12/2016 | Tejano | H02K 11/40 |
| 2019/0296617 A1* | 9/2019 | Hubert | H01R 39/64 |
| 2020/0263734 A1 | 8/2020 | Kottapalli et al. | |
| 2020/0295634 A1* | 9/2020 | Lenz | H01R 39/025 |
| 2021/0088076 A1* | 3/2021 | Knoblauch | F16C 19/52 |
| 2021/0115974 A1* | 4/2021 | Schamin | F16C 41/002 |

FOREIGN PATENT DOCUMENTS

| | | | | |
|---|---|---|---|---|
| JP | 2005114119 | | 4/2005 | |
| JP | 2005114119 A | * | 4/2005 | |
| JP | 2008286229 A | * | 11/2008 | |
| WO | WO-2020001674 A1 | * | 1/2020 | F16C 19/06 |
| WO | WO-2020015772 A1 | * | 1/2020 | |

OTHER PUBLICATIONS

Schamin, machine translation of WO2020015772, Jan. 2020 (Year: 2020).*

Murakami, machine translation of JP2008286229, Nov. 2008 (Year: 2008).*

Search Report for corresponding French Patent Application No. 2210913 dated Jan. 24, 2023.

Search Report for corresponding Italian Patent Application No. 102021000009005 dated Dec. 8, 2021.

Search Report for corresponding Italian Patent Application No. 102021000009014 dated Dec. 8, 2021.

Search Report for French Patent Application No. 2201589 dated Jul. 25, 2024.

* cited by examiner

ELECTRICAL MACHINE HAVING A CONDUCTIVE SLEEVE

CROSS-REFERENCE RELATED APPLICATIONS

This application is based on and claims priority to Italian Patent Application No. 102021000009005 filed on Apr. 12, 2021, under 35 U.S.C. § 119, the disclosure of which is incorporated by reference herein.

FIELD

The present disclosure relates generally to electrical rotary machines.

BACKGROUND

In electric rotary machines, a power supply generates a difference in electrical potential between and shaft and a housing, leading to an electrical potential between an inner ring and an outer ring of a bearing. The potential difference between the inner and the outer bearing rings can lead to a discharge of current through the bearing. Various embodiments in accordance with this disclosure will now be described with reference to the appended drawings illustrating non-limiting exemplary embodiments, in which.

DETAILED DESCRIPTION

Electrical rotary machines generally comprise a housing and a rotating shaft supported by at least one bearing. A current passing through the bearing may damage raceways and rolling elements of the bearing. Inadvertent electrical discharges can also create vibrations which increase acoustic noise of the rotary machine.

A rotating shaft may be grounded using a brush with conductive fibers. A grounding brush may be mounted to a frame of a rotary machine such that distal ends of its fibers radially contact an outer surface of a rotating shaft.

A conductivity of fibers of a grounding brush create a parallel electrical path and thus allows a shaft to maintain a same electrical potential as a frame of an integral machine. This also maintains a same electrical potential at an inner and an outer ring of a bearing supporting a shaft and significantly reduces electrical discharges through a bearing.

However, even with such a grounding brush, a resistance of a shaft surface has been found to increase over time due to a shaft surface electrical change. Indeed, during a service life of a motor, oxidation may occur on a surface of a shaft, due, for example to heat, humidity, electrical current flow, or friction.

Because of surface changes on a shaft, a grounding brush may have a higher resistance and a higher breakdown voltage than a bearing and may not be able to create a parallel path for a current. A current will then go through a bearing and create significant damage to the bearing and might even destroy it. Thus it is desirable to protect an outer surface of a rotating part in order to avoid any change during the service life of a motor.

In order to reduce risk of oxidation of an outer surface of a shaft, and thus maximize its conductivity, a coating made of a resin, such as epoxy, may be applied on the outer surface of the shaft to be protected. However, known coating solutions have low hardness and can be damaged or removed by sliding of a grounding brush. An aim of the present disclosure is to improve protection of a sliding surface of a rotating part.

The expressions "outer" and "inner" refer to a rotational axis of symmetry X of a rotating part of an electrical machine 10, with an inner part being closer to the axis X than an outer part.

Figure 1:
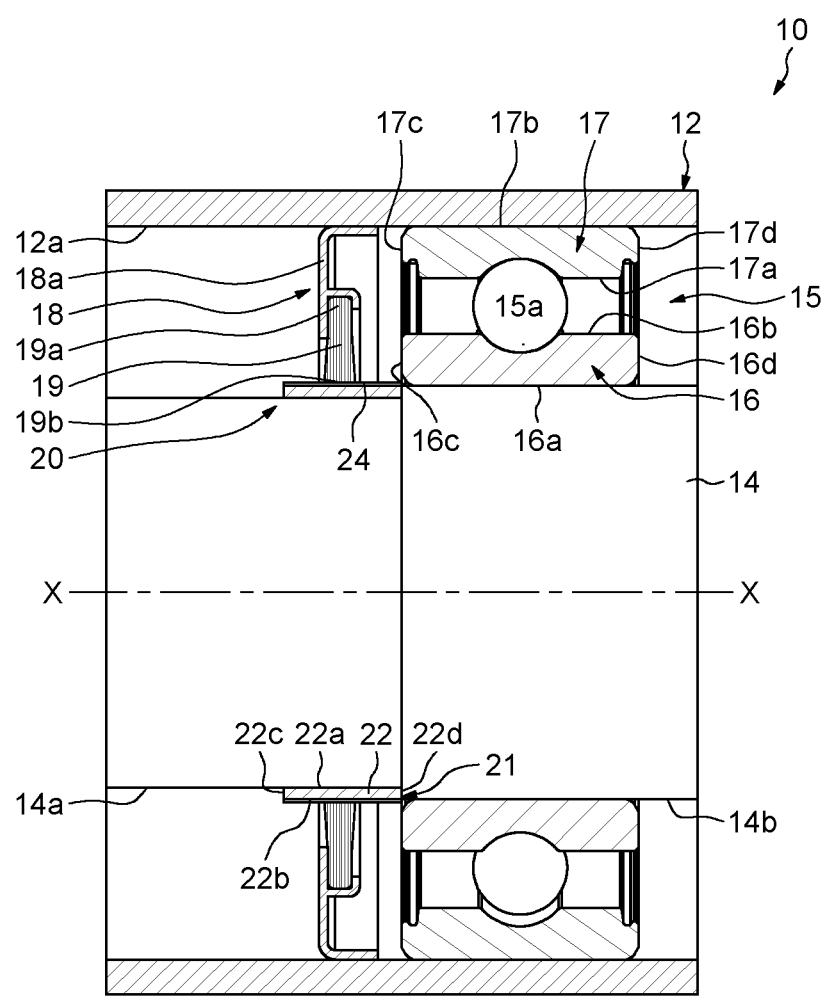
FIG. 1 is a schematic cross-section view of an electrical machine having a conductive sleeve according to an exemplary embodiment.

With reference to FIG. 1, exemplary embodiments of an electrical machine 10 may include a non-rotating housing 12, a rotating shaft 14, at least one bearing 15 supporting shaft 14, and a fiber grounding brush 18 mounted in the housing 12. In other embodiments, a shaft 14 may be non-rotating and a housing 12 may be rotating.

In various embodiments, a housing 12 may be radially delimited by an inner cylindrical surface 12a and an outer cylindrical surface 12b. A rotating shaft 1 may have a stepped outer cylindrical surface 14a, which may include a shoulder 14b. A bearing 15 may be mounted radially on an inner surface of a bore 12a of housing 12. Bore 12a may be provided with one or more shoulders for axially maintaining bearing 15 in housing 12.

In various embodiments, a bearing 15 may include an inner rotating ring 16, an outer non-rotating ring 17, and at least one row of one or more rolling elements 15a, e.g., rollers or balls, arranged between inner 16 and outer ring 17. Inner ring 16 and oute ring 17 may be in the form of concentric rings centered about rotation axis X of bearing 15. A bearing 15 may further include a cage (not shown) configured to maintain a circumferential spacing of one or more rolling elements. In some embodiment, inner ring 16 may be non-rotating and outer ring 17 may be rotating. In some embodiments, a bearing 15 may be a sliding bearing.

In various embodiments, an inner ring 16 of bearing 15 may be of a solid type and may be radially delimited by an inner cylindrical surface 16a that is in radial contact with a shaft 14, and an outer cylindrical surface 16b having at least one raceway for one or more rolling elements 15a. Inner ring 16 may further include two opposite radial frontal surfaces 16c and 16d that may axially delimit inner cylindrical surface 16a and outer cylindrical surface 16b.

In various embodiments, an outer ring 17 of a bearing 15 may be of a solid type and may be radially delimited by an inner cylindrical surface 17a having at least one raceway for one or more rolling elements 15a, and an outer cylindrical surface 17b that may be in radial contact with an inner surface 12a of a housing 12. Outer ring 17 may further include two radial frontal surfaces 17c and 17d that axially delimit inner cylindrical surface 17a and outer cylindrical surface 17b.

In various embodiments, a fiber grounding brush 18 may include a support 18a and a plurality of conductive fibers 19 having a first end 19a secured to support 18a and a second free end 19b, opposite to said first end, extending radially towards a shaft 14. In some embodiments, a plurality of conductive fibers 19 may be carbon fibers.

In various embodiments, a support 18a may be secured to a housing 12 by press fitting onto support 18 on an inner surface 12a of housing 12. In other embodiments, a support 18a may be secured to a housing 12 with suitable fasteners or adhesives. In yet another embodiment, a support 18a may be secured to a bearing 15 at an outer ring 17.

A machine 10 may further comprise a conductive sleeve 20 acting as a sliding surface for a free end 19b of a plurality of fibers 19 of a grounding brush 18.

As illustrated in various embodiments consistent with FIG. 1, a conductive sleeve 20 may include a base 21 having an annular ring 22 that may be press-fitted on an outer cylindrical surface 14a of a rotating shaft 14. An annular ring 22 may be radially delimited by an inner cylindrical surface 22a that may be in contact with shaft 14 and by an outer cylindrical surface 22b. Conductive sleeve 22 may further be axially delimited by two opposite radial frontal surfaces 22c and 22d. In some embodiments, an inner cylindrical surface 22a and an inner outer cylindrical surface 22b may be axially delimited by opposite radial frontal surfaces 22c and 22d.

In various embodiments, a radial frontal surface, e.g., 22d may bear axially against a shoulder 14b of a shaft 14. An axial position of a sleeve 20 may be defined by shoulder 14b.

A base 21 of a conductive sleeve 20 may be made of a metallic material, such as steel, stainless steel, brass, aluminium, or copper, or of a polymer material, such as nylon 6 (PA6), polyphenylene sulfide (PPS), nylon 6-6 (PA66), or polyetheretherketone (PEEK).

In various embodiments, an outer surface 22b of an annular ring 22 may be covered with a layer 24 of a conductive material. Conductive layer 24 may cover an entire outer surface 22b of the annular ring 22. In other embodiments, a conductive layer 24 may cover a part of an outer surface 22b of an annular ring 22. In a further embodiment, both a conductive sleeve 20 and an outer surface 22b may be covered with a conductive layer 24.

In various embodiment, applying a conduct layer 24 to an outer surface 22b may include applying a metallic material to outer surface 22b of annular ring 22 by electroplating. In other embodiments, covering an outer surface 22b with a layer 24 of conductive material by done by applying a metallic material to outer surface 22b by electroless plating.

In various embodiments, a conductive sleeve 20 may be covered with a conductive layer 24. Covering conductive sleeve 20 with conductive layer 24 may include applying a metallic material to conductive sleeve 20 by electroplating. In other embodiments, covering conductive sleeve 20 with conductive layer 24 may include applying a metallic material to outer surface conductive sleeve 20 by electroless plating.

In various embodiments, a conductive layer 24 may face a free end 19b of a plurality of fibers 19 of a conductive brush 18 and may form a sliding surface for fibers 19. Free end 19b of fibers 19 may be in radial contact with a conductive layer 24 of a conductive sleeve 20.

The metallic material of conductive layer 24 may be, in some embodiments, a noble material, such as gold, silver, or platinum. In other embodiments, the metallic material of conductive layer 24 may be an ignoble material, such as tin or nickel.

Figure 2:
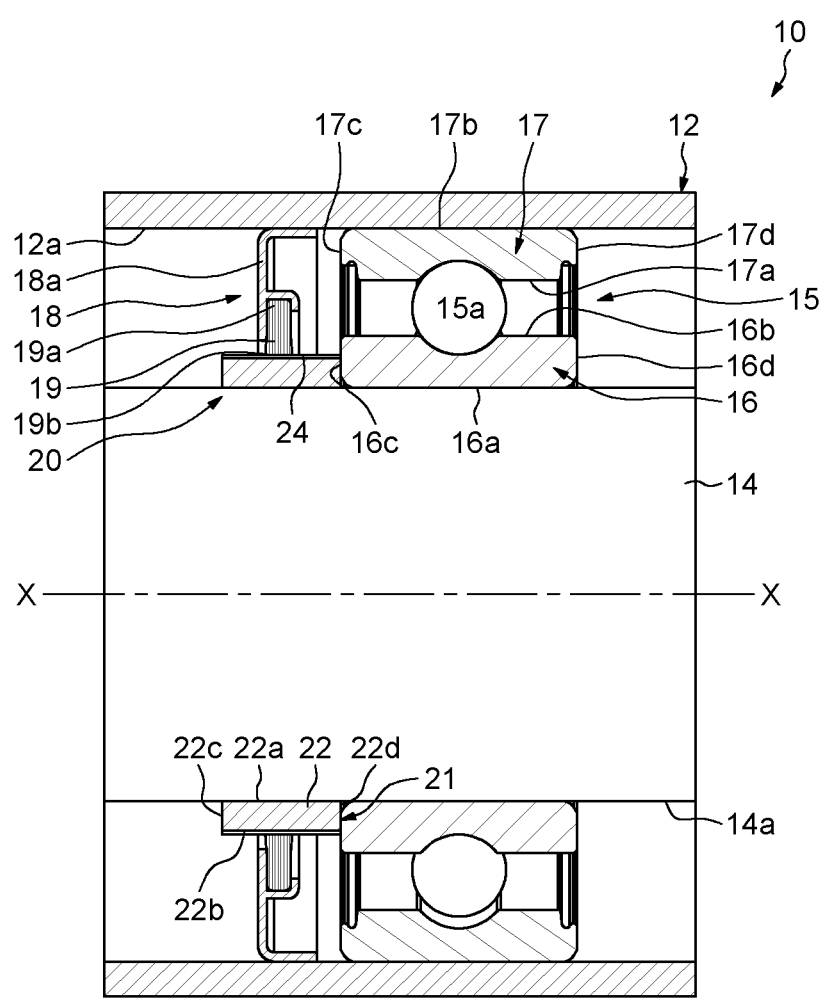
FIG. 2 is a schematic cross-section view of an electrical machine having a conductive sleeve according to a second embodiment.

With reference to FIG. 2, various embodiments of an electrical machine 10 may include an outer cylindrical surface 14a of a shaft 14 that is without a shoulder. In such embodiments, a conductive sleeve 20 may bear axially against an inner ring 16 of a bearing 15. A lateral surface 22d of an annular ring 22 of a base 21 of conductive sleeve 20 may bear axially against a lateral surface 16c of inner ring 16. Annular ring 22 may have an increased thickness to support greater axial loads. A conductive sleeve 20 may act as a sliding surface for a brush 18 and may act as a spacer for bearing 15. A free end 19b of a plurality of fibers 19 of conductive brush 18 may be in radial contact with conductive layer 24 of conductive sleeve 20.

Figure 3:
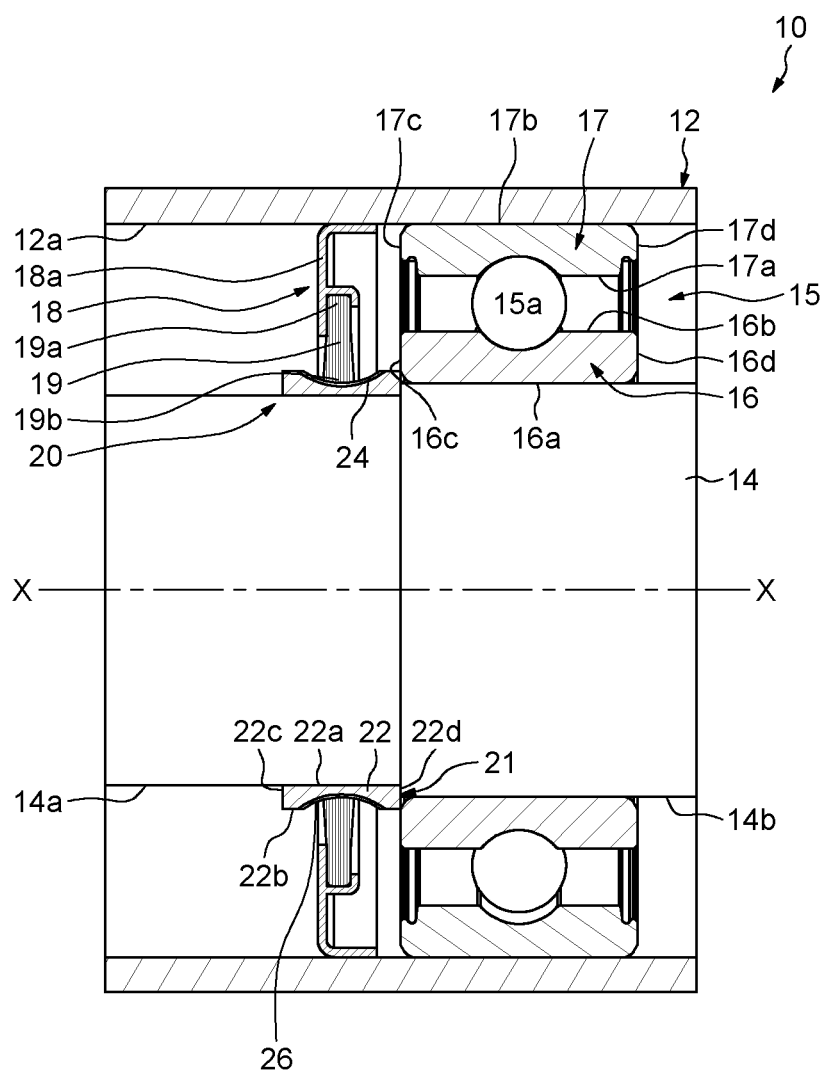
FIG. 3 is a schematic cross-section view of an electrical machine having a conductive sleeve according to a third embodiment.

With reference to FIG. 3, various embodiments of an electrical machine 10 may include an annular ring 22 having a raceway 26 at an outer cylindrical surface 22b. Annular ring 22 may be radially delimited by an inner cylindrical surface 22a that may be in radial contact with a shaft 14 and outer cylindrical surface 22b. Annular ring 22 may be axially delimited by two opposite radial front faces 22c and 22d. Radial front faces 22c and 22d may also axially delimit an inner cylindrical surface 22a and outer cylindrical surface 22b.

As In various embodiments, an annular ring 22 of a conductive sleeve 20 may be press-fitted on an outer cylindrical surface 14a of a rotating shaft 14.

In various embodiments, raceway 26 may be a toroidal raceway. A toroidal raceway 26 may be covered in a conductive layer 24. Conductive layer 24 may be made of a metallic material. In various embodiments, conductive layer 24 may be applied by electroplating. In other embodiment, conductive layer 24 may be applied by electroless plating.

While FIG. 3 depicts a raceway 26 covered in a conductive layer 24, it should be appreciated that in alternative embodiments, a conductive layer 24 may cover an entire outer surface 22b of an annular ring 22.

In various embodiments, raceway 26 may axially contain a plurality of fibers 19 of a conductive brush 18 in order to maximize contact between a free end 19b of fibers 19 and conductive layer 24.

Figure 4:
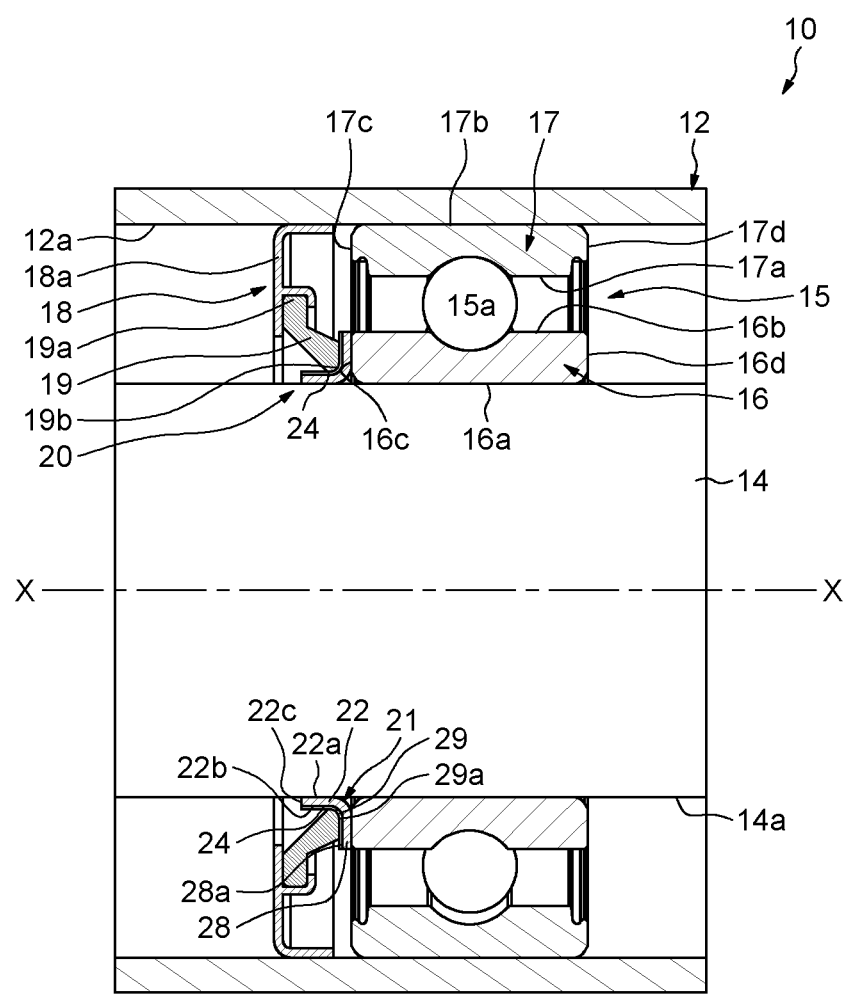
FIG. 4 is a schematic cross-section view of an electrical machine having a conductive sleeve according to a fourth embodiment.

As illustrated in FIG. 4, various embodiments of an electrical machine 10 may alternatively include a base 21 of a conductive sleeve 20 that include an annular ring 22 and a radial portion 28 extending radially from annular ring 22 and towards the an outer ring 17. Annular ring 22 and radial portion 28 may be connected by a rounded portion 29. Radial portion 28 may axially bear against an inner ring 16.

In various embodiments, an annular ring 22 of a conductive sleeve 20 may be press-fitted on an outer cylindrical surface 14a of a rotating shaft 14.

As illustrated in FIG. 4, a conductive layer 24 may cover an outer surface 29a of a rounded portion 29. A plurality of fibers 19 of a conductive brush 18 may extend towards rounded portion 29 at an incline such that a free end 19b is in radial and axial contact with conductive layer 24.

In various embodiments, a conductive layer 24 may cover an entire outer surface of a base 21. A plurality of fibers 19 may thus radially contact an outer surface 22b of an annular ring 22 and axially contact a lateral surface 28a of a radial portion 28.

Figure 5:
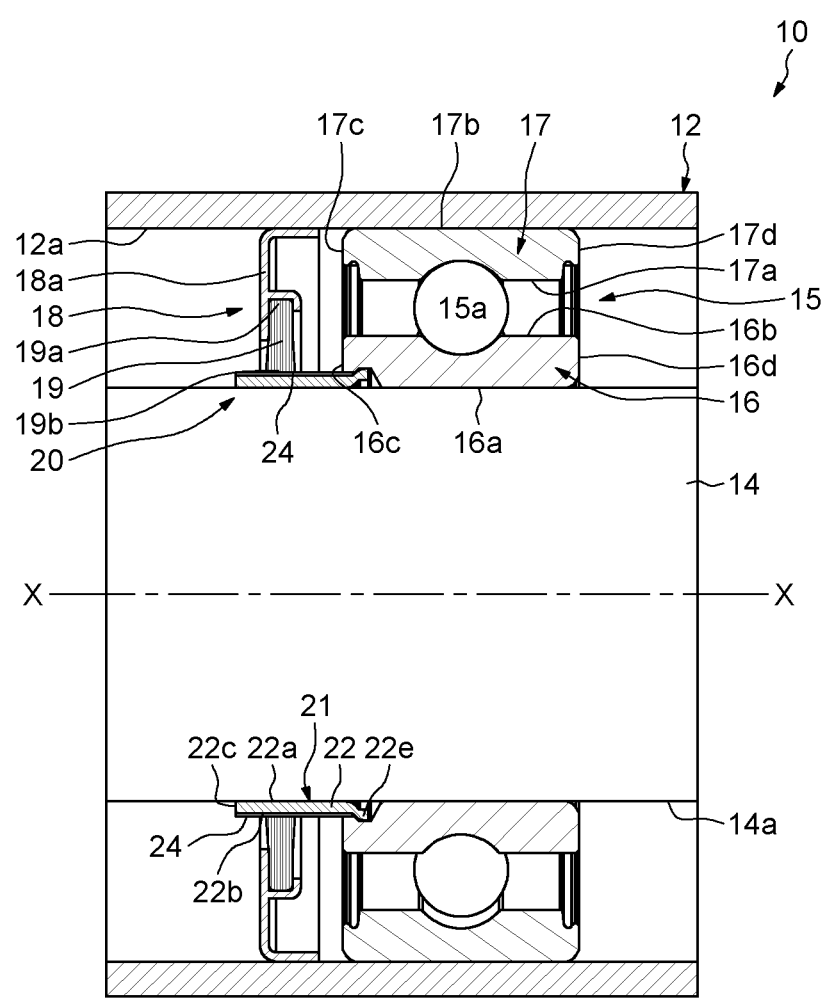
FIG. 5 is a schematic cross-section view of an electrical machine having a conductive sleeve according to a fifth embodiment.

As illustrated in FIG. 5, various embodiments of an electrical machine 10 may include an annular ring 22 of a conductive sleeve 20 having one or more fastening rib 22e extending radially from a lateral surface 22d of annular ring 22 and towards an outer ring 17. Fastening rib 22e may cooperate with a groove 16e provided on an inner surface 16a of an inner ring 16 of a bearing 15. A free end 19b of a plurality of fibers 19 of a conductive brush 18 may be in radial contact with a conductive layer 24 of conductive sleeve 20.

In various embodiments, one or more fastening ribs 22e may be annular. In other embodiments, one or more fastening ribs 22e may include a plurality of circumferentially spaced ribs.

As illustrated in FIG. 5, crimping a conductive sleeve 20 onto an inner ring 16 of a bearing 15 may simplify assembly of conductive sleeve 20 because no interference is needed on a shaft 14 and concentricity between a conductive brush 18 and conductive sleeve 20 is improved.

Figure 6:
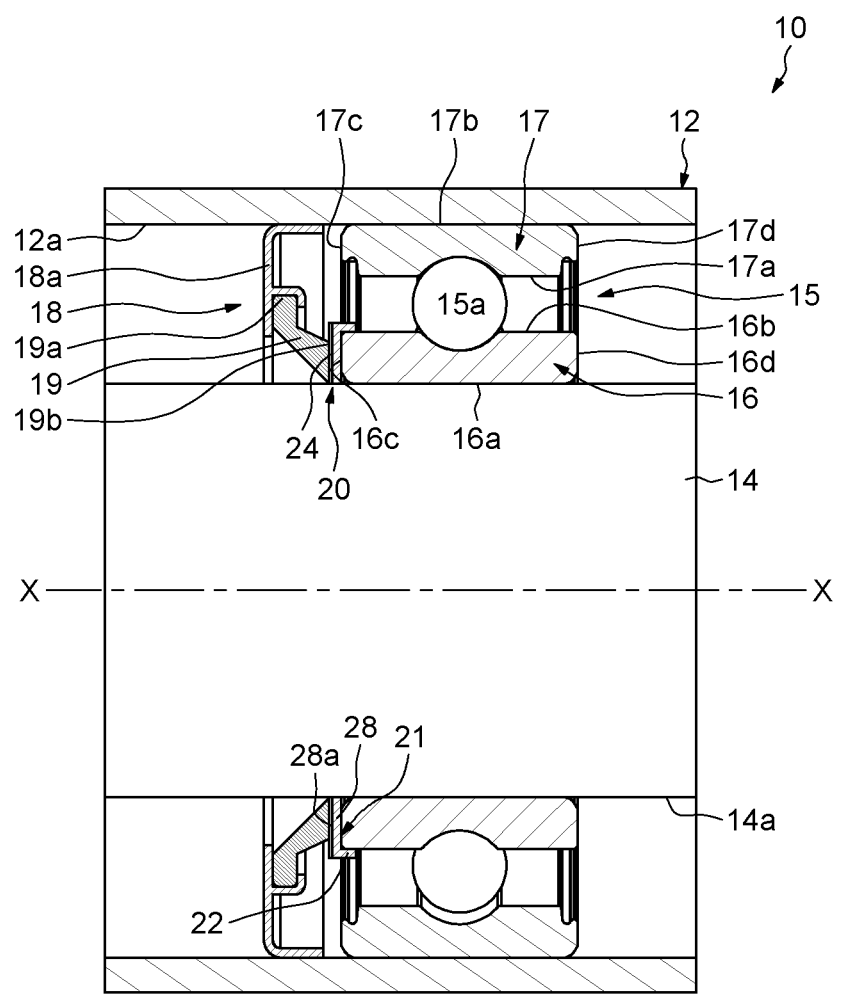
FIG. 6 is a schematic cross-section view of an electrical machine having a conductive sleeve according to a sixth embodiment.

As illustrated in FIG. 6, various embodiments of an electrical machine 10 may include a base 21 of a conductive sleeve 20 having an annular ring 22 and a radial portion 28 extending radially from annular ring 22 and towards an inner ring 16. Radial portion 28 may bear axially against a lateral surface 16c of inner ring 16.

In various embodiments, an annular ring 22 of conductive sleeve 20 may be press-fitted on an outer cylindrical surface 16b of inner ring 16 of a bearing 15. Alternatively, annular ring 22 may be crimped on outer cylindrical surface 16b.

As illustrated in FIG. 6, a conductive layer 24 may cover a lateral surface 28a of a radial portion 28. A plurality of fibers 19 of a conductive brush 18 may extend towards a radial portion 28 at an incline relative to an axis of symmetry X of a bearing 15 such that a free end 19b of a plurality of fibers 19 of a conductive brush 18 is in axial contact with conductive layer 24. In various embodiments, a shape of a conductive sleeve 20 may be compact by having fibers of a brush extend in an inclined direction towards a radial portion.

Figure 7:
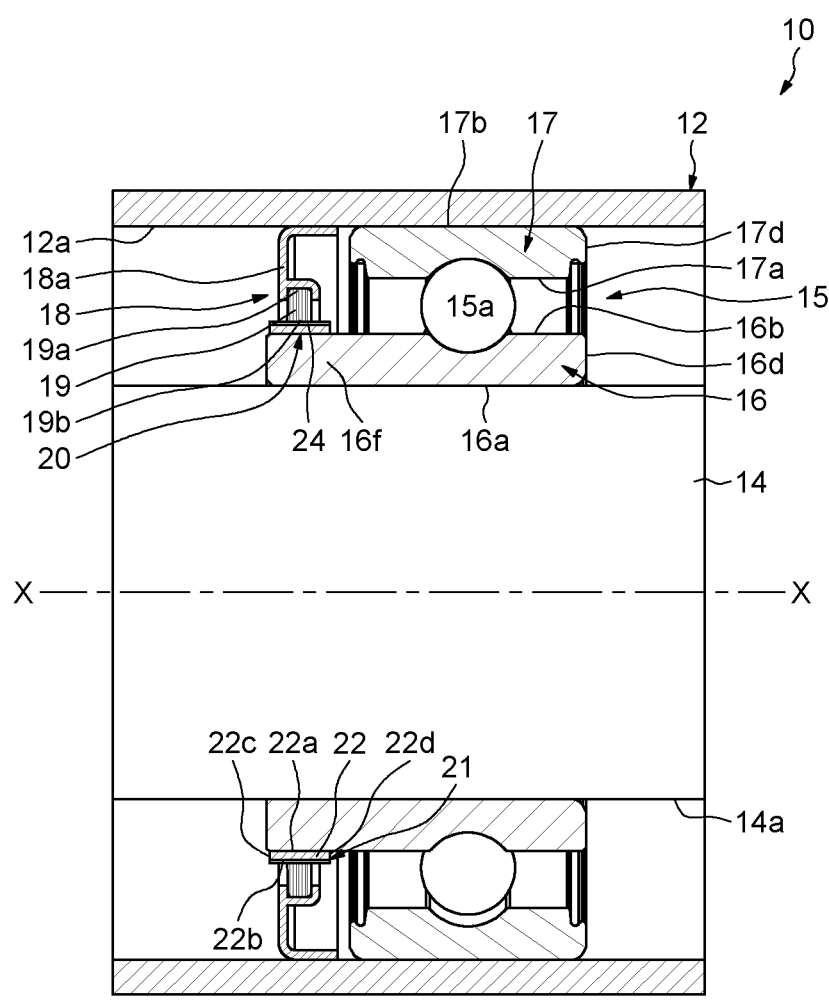
FIG. 7 is a schematic cross-section view of an electrical machine having a conductive sleeve according to a seventh embodiment.

As illustrated in FIG. 7, various embodiments of an electrical machine may include a conductive sleeve 20 press fitted to a bearing 15. A bearing 15 may include an inner ring 16 having an axial portion 16f extending axially beyond a lateral surface 17c of an outer ring 17. An annular ring 22 of conductive sleeve 20 may be press fitted on an outer surface of axial portion 16f of inner ring 16. A free end 19b of a plurality of fibers 19 of a conductive brush 18 may be in radial contact with a conductive layer 24 of conductive sleeve 20.

In embodiments consistent with this disclosure, a base 21 of a conductive sleeve 20 may be made of a metallic material, such as steel, stainless steel, brass, aluminium, or copper. In other embodiments, base 21 of conductive sleeve 20 may be made of a polymer material such as PA6, PPS, PA66, or PEEK.

The base 21 is further covered with the layer 24 of conductive material made in metallic material applied by electroplating or electroless plating in order to cover at least partially the outer surface of the base 21.

In an alternative, all the surfaces of the base 21 may be covered with the layer 24.

In embodiments consistent with this disclosure, the metallic material of a conductive layer 24 may be a noble material, such as gold, silver, or platinum. Noble metals are extremely resistant to chemical change and thus to corrosion. In addition, platting provides a harder sliding surface than an epoxy coating and is thus more resistant over time to the brush abrasion.

In embodiments consistent with this disclosure, the metallic material of a conductive layer 24 may be an ignoble material, such as tin or nickel. Ignoble materials have a fast corrosion layer that is thin enough to maintain good electrical performance.

Combining a grounding brush with a sleeve having a sliding surface made of such conductive material reduces the contact resistance and the breakdown voltage of the brush during the service life of the motor. BY embodiments consistent with this disclosure, sliding surface changes are reduced during the service life of the machine.

It is a further aim of the present disclosure to provide an electrical machine with a non-rotating part, a rotating part, at least one bearing supporting said rotating part and a fiber grounding brush, fixed to said non-rotating part. Said bearing may include a rotating ring and a non-rotating ring. Said fiber grounding brush may include a support secured to the non-rotating part and a plurality of conductive fibers having a first end secured to said support and a second free end, opposite to said first end, extending towards the rotating part.

An electrical machine may further include a conductive sleeve having a base fastened to the rotating part or to the rotating ring of the bearing and a conductive layer covering at least partially a surface of the base facing the second free end of the conductive fibers of the fiber grounding brush such that said second free end is in contact with said conductive layer.

The conductive sleeve acts as an integrated, dedicated sliding surface for the grounding brush and ensures a minimum contact resistance overtime and avoids sliding surface change over time.

The conductive sleeve and notably the conductive layer acts as a sliding surface for the free end of the fibers of the grounding brush.

According to various embodiments, the base of the conductive sleeve includes an annular ring fixed to the rotating part or to the rotating ring of the bearing. For example, the annular ring may be press-fitted on an outer cylindrical surface of the rotating part. Alternatively, the rotating part may include a shoulder against which the annular ring of the conductive sleeve bears axially.

In various embodiments, the conductive sleeve axially bears against the rotating ring of the bearing. In this case, the conductive sleeve acts as a sliding surface for the brush and as a spacer for the bearing.

According to various embodiments, the annular ring of the conductive sleeve includes a toroidal raceway inside which protrude the fibers of the brush, said raceway being covered with the conductive layer. In other words, said raceway axially contains the fibers of the brush.

According to various embodiments, the base of the conductive sleeve includes a radial portion extending radially from the annular ring towards the non-rotating part, said annular ring and radial portion connected by a rounded portion, and said radial portion bearing axially against the rotating ring of the bearing.

In various embodiments, the conductive layer covers an outer surface of the rounded portion such that the free end of the fibers of the brush slide on said rounded portion. Therefore, the fibers of the brush may extend in an inclined direction towards the rounded portion.

In various embodiments, the conductive layer may cover the entire outer surface of the base. The fibers of the brush may thus contact the outer surface of the annular ring or the lateral surface of the radial portion.

According to various embodiments, the annular ring of the conductive sleeve includes a fastening rib extending radially from one lateral surface of the annular ring towards the non-rotating part, said fastening rib cooperating with a groove provided on a surface of the rotating ring of the bearing. For example, the fastening ribs may be annular or may include a plurality of circumferentially spaced ribs.

Crimping the conductive sleeve onto the rotating ring of the bearing allows to simplify the assembly of said conductive sleeve since no interference is needed on the rotating part of the machine.

According to various embodiments, the annular ring of the conductive sleeve is press-fitted or crimped on the rotating ring of the bearing. The base of the conductive sleeve includes a radial portion extending radially from the annular ring towards the rotating part, where at least said radial portion is covered with the conductive layer. Said radial portion of the conductive sleeve may bear axially against the lateral surface of the rotating ring of the bearing. For example, fibers of the brush extend in an inclined direction towards the radial portion. Such particular shape of the conductive sleeve allows to be compact.

According to various embodiments, the rotating ring includes an axial portion extending axially beyond the lateral surface of the non-rotating ring, the annular ring of the conductive sleeve being press fitted on the outer surface of the axial portion of the rotating ring.

Advantageously, the conductive layer is applied by platting on the base of the conductive sleeve, for example, by electroplating or electroless plating. In various embodiments, the base is totally covered with the conductive layer.

In various embodiments, the base of the conductive sleeve is made of a metallic material, such as steel, stainless steel, brass, aluminium, or copper, or is made of a polymer material such as nylon 6 (PA6), polyphenylene sulfide (PPS), nylon 6-6 (PA66), or polyetheretherketone (PEEK).

In various embodiments, a metallic material may be an noble material such as gold, silver, or platinum. In other embodiments, the metallic material may be an ignoble material such as tin or nickel.

In various embodiments, the rotating part is a shaft and the non-rotating part is a housing.

In various embodiments, the rotating ring is the inner ring and the non-rotating ring is the outer ring of the bearing.

It should be noted that the electrical machine has been described with reference to an exemplary embodiment in which the shaft is the rotating part and the housing is the non-rotating part. However, the disclosure also relates to embodiments in which the shaft is the non-rotating part and the housing is the rotating part. In a general way, the fiber grounding brush is fixed to the non-rotating part or the non-rotating ring of the bearing and the conductive sleeve is fixed to the rotating part or the rotating ring of the bearing.

We claim:

1. An electrical machine comprising:
   a non-rotating part;
   a rotating part;
   at least one bearing supporting the rotating part, the bearing comprising a rotating inner ring and a non-rotating outer ring;
   a fiber grounding brush fixed to the non-rotating part, the fiber grounding brush comprising a support secured to the non-rotating part and a plurality of conductive fibers having a first end secured to the support and a second free end opposite the first end;
   a conductive sleeve comprising a base fastened to an outer cylindrical surface of the rotating inner ring, the base comprising:
   a radial portion bearing against a lateral side surface of the rotating inner ring; and
   an axial portion bearing against the outer cylindrical surface of the rotating inner ring; and
   a conductive layer covering at least a portion of a surface of the radial portion of the conductive sleeve,
   wherein the second free end of the plurality of conductive fibers contacts the conductive layer.

2. The electrical machine according to claim 1, wherein the conductive layer is applied by electro platting on the base of the conductive sleeve.

3. The electrical machine according to claim 1, wherein the conductive layer is applied by electroless platting on the base of the conductive sleeve.

4. The electrical machine according to claim 1, wherein the base of the conductive sleeve is made of a metallic material.

5. The electrical machine according claim 4, wherein the metallic material is a noble material.

6. The electrical machine according to claim 4, wherein the metallic material is an ignoble material.

7. The electrical machine according to claim 1, wherein the base of the conductive sleeve is made of a polymer material.

8. The electrical machine of claim 1, wherein the base of the conductive sleeve is crimped onto the radially outer surface of the rotating inner ring.

* * * * *